US009094954B2

(12) United States Patent
Mun et al.

(10) Patent No.: US 9,094,954 B2
(45) Date of Patent: Jul. 28, 2015

(54) MOBILE TERMINAL AND CONTROLLING METHOD THEREOF

(71) Applicant: LG ELECTRONICS INC., Seoul (KR)

(72) Inventors: Sukhwan Mun, Seoul (KR); Yunseong Nam, Seoul (KR); Hyungin Yoo, Seoul (KR); Dongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 13/955,946

(22) Filed: Jul. 31, 2013

(65) Prior Publication Data
US 2014/0038624 A1   Feb. 6, 2014

(30) Foreign Application Priority Data

Aug. 1, 2012 (KR) .......................... 10-2012-0084492

(51) Int. Cl.
*H04M 3/42* (2006.01)
*H04M 11/10* (2006.01)
*H04W 72/00* (2009.01)
*H04M 9/00* (2006.01)
*H04M 1/00* (2006.01)
*H04W 76/04* (2009.01)
*H04W 4/16* (2009.01)
*H04M 1/725* (2006.01)
*H04M 1/64* (2006.01)
*H04M 1/253* (2006.01)

(52) U.S. Cl.
CPC ............ *H04W 76/04* (2013.01); *H04M 1/7255* (2013.01); *H04W 4/16* (2013.01); *H04M 1/2535* (2013.01); *H04M 1/64* (2013.01); *H04M 1/72583* (2013.01)

(58) Field of Classification Search
CPC .................. H04M 1/72547; H04M 1/72522; H04M 1/72583
USPC ............... 455/413, 414.1, 417, 450, 401, 567
See application file for complete search history.

(56) References Cited

U.S. PATENT DOCUMENTS

2002/0181674 A1\* 12/2002 Cannell et al. ............. 379/93.01
2003/0182374 A1\* 9/2003 Haldar .......................... 709/205

(Continued)

FOREIGN PATENT DOCUMENTS

WO   2011057010   5/2011
WO   2011063011   5/2011

OTHER PUBLICATIONS

European Patent Office Application Serial No. 13003834.2, Search Report dated Dec. 5, 2013, 6 pages.

*Primary Examiner* — Dung Hong
(74) *Attorney, Agent, or Firm* — Lee, Hong, Degerman, Kang & Waimey

(57) ABSTRACT

A mobile terminal and controlling method thereof are disclosed, which facilitates a terminal to be used in further consideration of user's convenience. The present invention includes receiving a call signal for requesting an establishment of a second session from a second counterpart via a wireless communication unit while a first session with a first counterpart is established and transmitting user data to the second counterpart using an available radio resource of a standby session for waiting for the establishment of the second session. Accordingly, if an incoming call is received from a different counterpart in the course of a call to a prescribed counterpart, a prescribed data is sent to the different counterpart to inform that the call cannot be connected.

22 Claims, 14 Drawing Sheets

(56) References Cited

U.S. PATENT DOCUMENTS

| | | | |
|---|---|---|---|
| 2004/0267527 A1* | 12/2004 | Creamer et al. | 704/235 |
| 2011/0111735 A1* | 5/2011 | Pietrow | 455/414.1 |
| 2013/0005294 A1* | 1/2013 | Levinson et al. | 455/404.2 |
| 2013/0061153 A1* | 3/2013 | Simoes et al. | 715/753 |
| 2013/0072164 A1* | 3/2013 | Balannik et al. | 455/412.2 |

* cited by examiner (a)   (b)

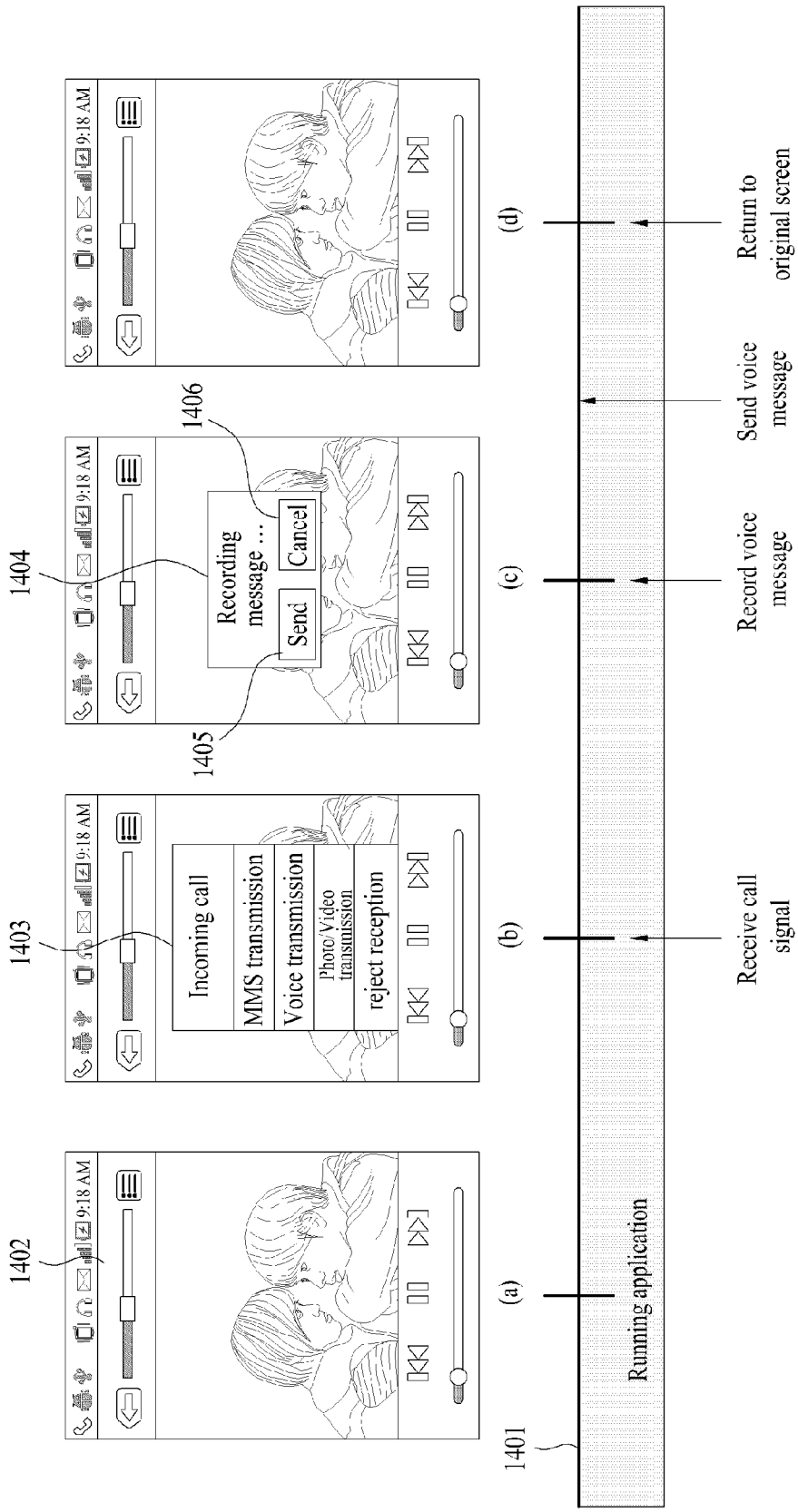

MOBILE TERMINAL AND CONTROLLING METHOD THEREOF

CROSS-REFERENCE TO RELATED APPLICATION

Pursuant to 35 U.S.C. §119(a), this application claims the benefit of earlier filing date and right of priority to Korean Application No. 10-2012-0084492, filed on Aug. 1, 2012, the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal Particularly, as performance of a mobile terminal is rapidly increasing, methods of exchanging multimedia data between mobile terminal users are getting further diversified. However, while a user is talking to one counterpart over a mobile terminal, in case that the user rejects a call received from another counterpart, it is disadvantageous in that a method of transmitting data to another counterpart is limitative.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which more visual or efficient information can be delivered, while a user is talking to one counterpart over the mobile terminal, using various data forms in case of rejecting a call received from another counterpart.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a wireless communication unit and a controller, if a call signal for requesting an establishment of a second session is received from a second counterpart via the wireless communication unit while a first session with a first counterpart is established, controlling user data to be transmitted to the second counterpart using an available radio resource of a standby session waiting for the establishment of the second session.

In another aspect of the present invention, a method of controlling a mobile terminal according to the present invention may include the steps of receiving a call signal for requesting an establishment of a second session from a second counterpart via a wireless communication unit while a first session with a first counterpart is established and transmitting user data to the second counterpart using an available radio resource of a standby session for waiting the establishment of the second session.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 14 is a diagram of a process for processing a response to a call, which is received while a specific application (e.g., a video player) is activated by the controller 180, according to another embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
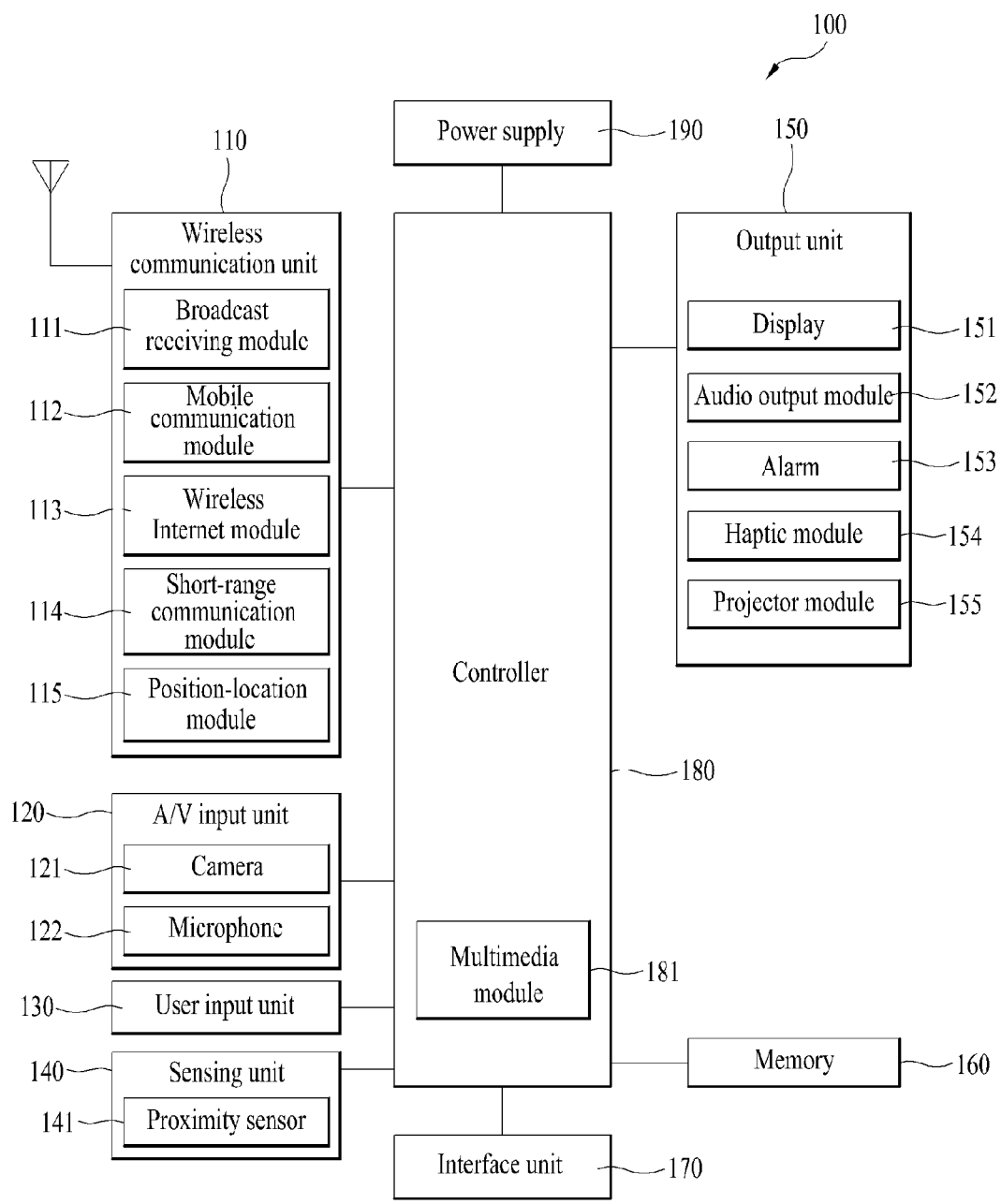
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN(Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (AN) input unit 120 is configured to provide audio or video signal input to the mobile terminal 100. As shown, the AN input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
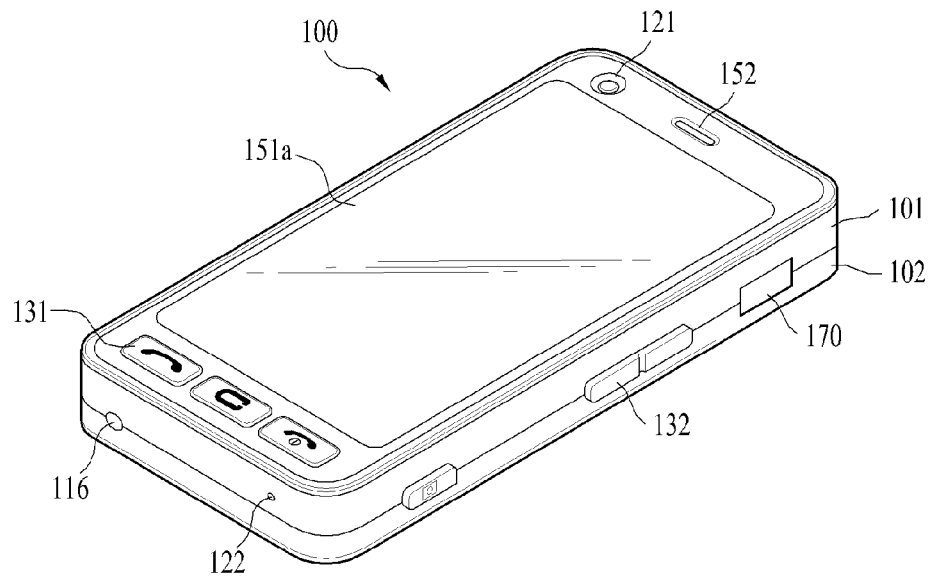
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
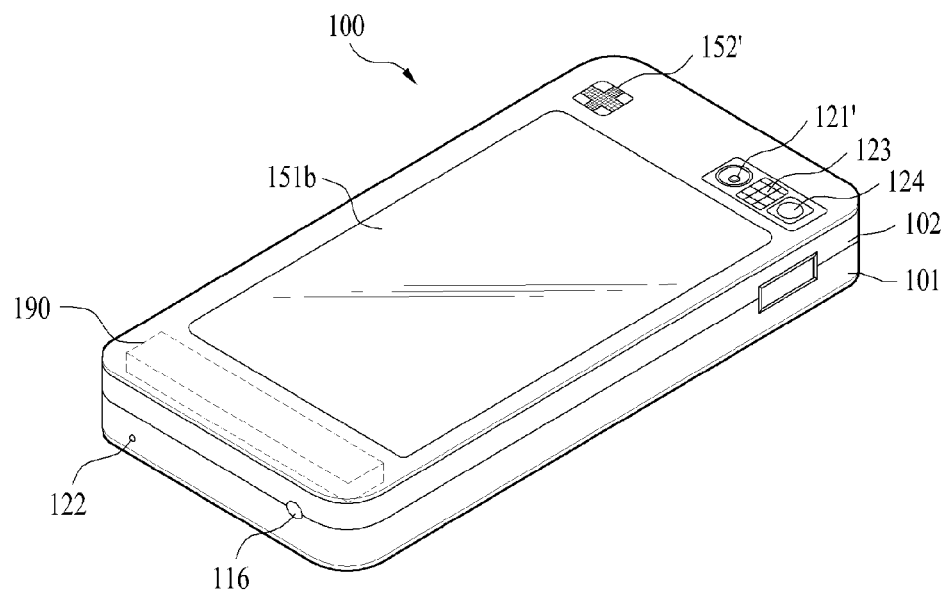
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display 151. In this case, if the display 151 is configured to output visual information from its both faces, it is able to recognize the visual information via the touchpad as well. The information outputted from both of the faces can be entirely controlled by the touchpad. Alternatively, a display is further provided to the touchpad so that a touchscreen can be provided to the rear case 102 as well.

The touchpad is activated by interconnecting with the display 151 of the front case 101. The touchpad can be provided in rear of the display 151 in parallel. The touchpad can have a size equal to or smaller than that of the display 151.

In the following description, embodiments for a controlling method, which can be implemented in the above-configured mobile terminal, shall be explained with reference to the accompanying drawings.

Figure 3:
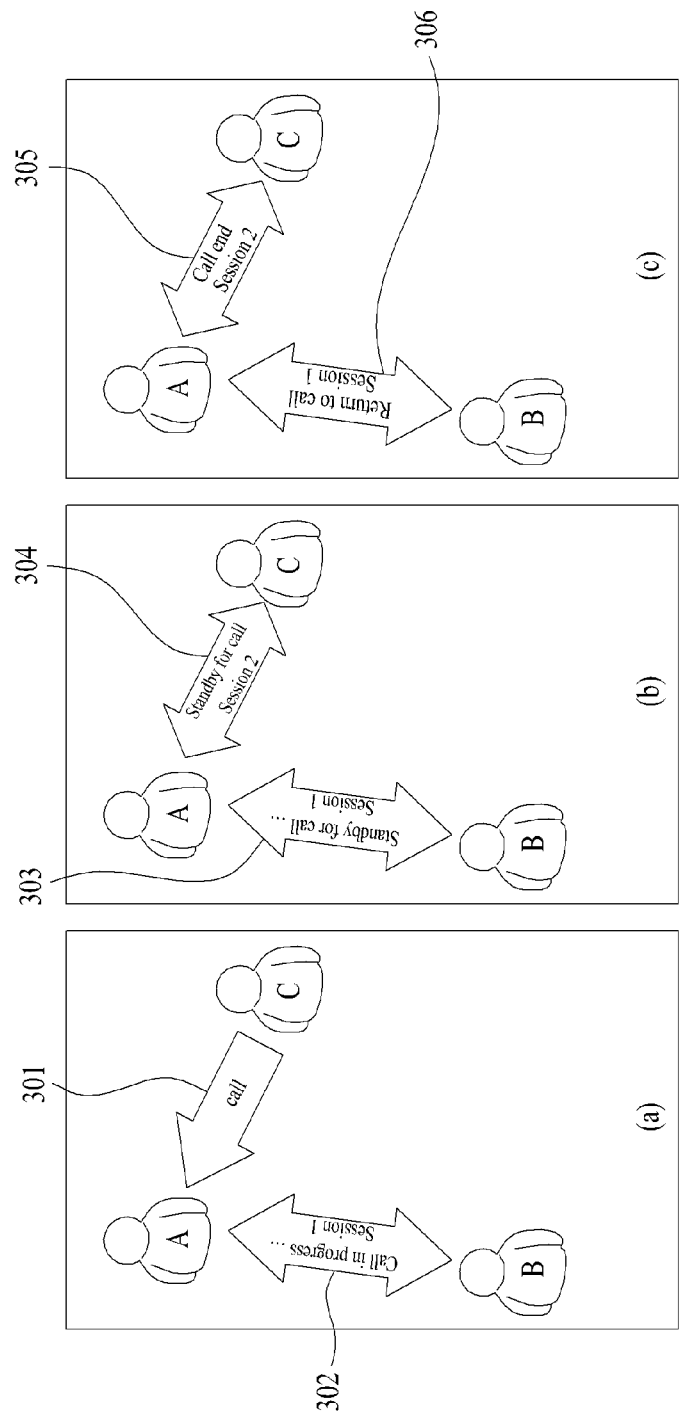
FIG. 3 is a diagram for one example of a general method of establishing a session in the course of talking to one counterpart over a mobile terminal in case of receiving an incoming call from another counterpart.

FIG. 3 is a diagram for one example of a general method of establishing a session in the course of talking to one counterpart over a mobile terminal in case of receiving an incoming call from another counterpart. In this case, the session means a connected state in which two mobile terminals can identify each other to exchange data persistently by finding each other's locations.

FIG. 3(*a*) is a diagram to illustrate a case that, a user A of a mobile terminal receives a phone call signal 301 from a second counterpart C in the course of talking to a first counterpart B over the mobile terminal during an established session 302 between the user A and the first counterpart B.

FIG. 3(*b*) is a diagram to illustrate a case that the user A accepts the call signal of the second counterpart C. The first session of communication with the first counterpart previously on the line is on standby 303 a second session 304 which is newly established, is a session with the second counterpart C.

Meanwhile, a person, who pays a charge or bill, may be changed in accordance with a billing policy of a communication service provider once the second session is established, a charge for the second session may be imposed on the user A or the second counterpart C.

If the call to the second counterpart C ends 305, the second session ends [FIG. 3(*c*)]. Subsequently, the first session, which is the original session, is re-established 306 to maintain the original call.

Thus, though the user A makes a call by establishing the second session with the second counterpart C for a simple information delivery, if the second session is established, a charge is imposed.

If data is transmitted before establishing a session after receiving a call signal, it may be called an early media session. In the following description, the early media session is explained in detail with reference to FIG. 4.

Figure 4:
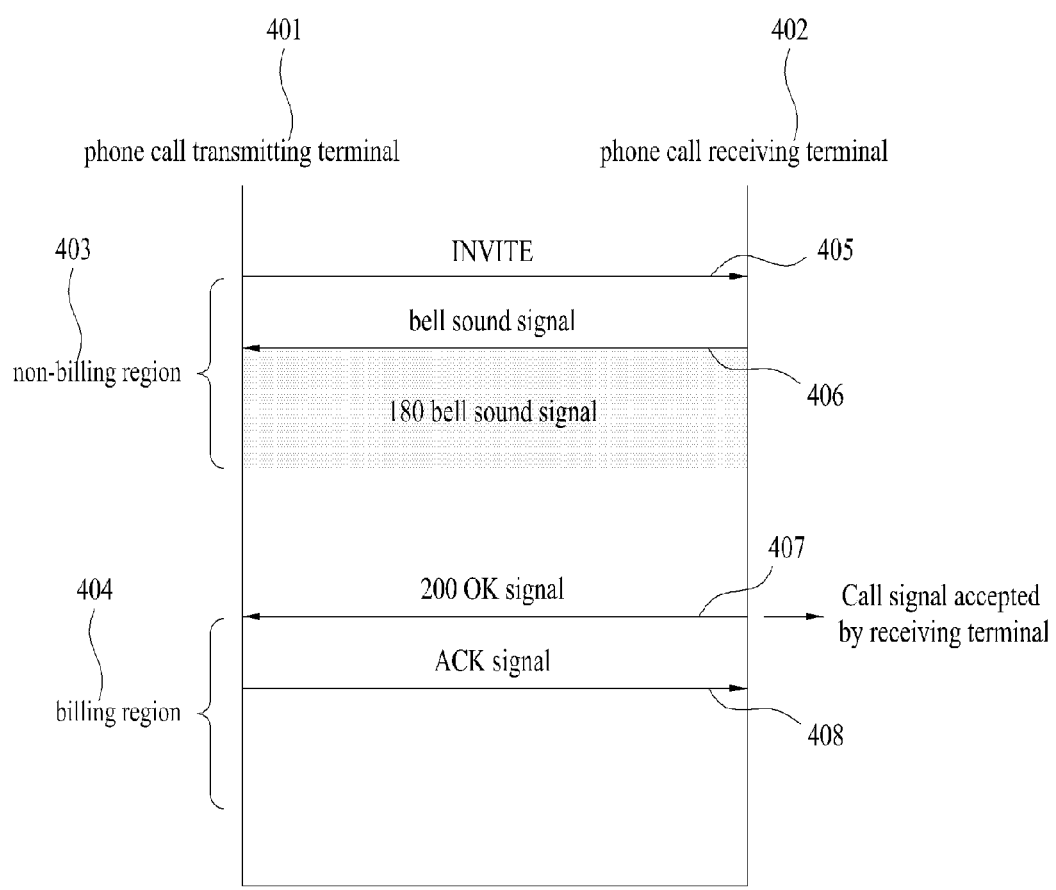
FIG. 4 is a diagram for one example of a process for establishing a session under a generally used protocol.

FIG. 4 is a diagram for one example of a process for establishing a session under a generally used protocol.

Referring to FIG. 4, a phone call transmitting terminal 401 transmits a call signal to a phone call receiving terminal 402 and a session is then established. This process is illustrated in the drawing using SIP (session initiation protocol). Yet, it is apparent that embodiments of the present invention are applicable to a protocol for establishing a session to make a call as well as to the SIP.

The SIP (session initiation protocol) is the most popular protocol that facilitates a connection and release between terminals in a packet network, is included in the 3GPP IMS specification and the like, and is used for CDMA packet based video communication as well.

First, the phone call transmitting terminal 401 sends an invite signal 405 to the phone call receiving terminal 402. In this case, the invite signal is the signal for proposing an establishment of a session and basically includes information required for establishing a session. In this case, the information required for establishing the session may include an address for receiving a response to the invite signal, SIP URL (session initiation protocol uniform resource locator) necessary to be connected to a receiving terminal, SIP URL necessary to be connected to a transmitting terminal and the like.

Having received the invite signal 405, the phone call receiving terminal 402 sends a 180 signal 406 to the phone call transmitting terminal 401. In this case, the 180 signal is an incoming call sound. Hence, if the incoming call sound is heard, the phone call transmitting terminal 401 is able to confirm that a user of the phone call transmitting terminal 401 is waiting for an acceptance by the phone call receiving terminal 402.

Moreover, when the incoming call sound is heard, a bell sound may be outputted from the phone call receiving terminal 402. Hence, a user of the phone call receiving terminal 402 hears the bell sound and may accept a reception of the call.

If the reception of the call is accepted by the phone call receiving terminal 402, the phone call receiving terminal 402 sends a 200 OK signal 407 to the phone call transmitting terminal 401. In this case, the 200 OK signal 407 is the signal for granting an establishment of a session.

In the following description, an interval between one timing point of sending an invite signal from the phone call transmitting terminal 401 to the phone call receiving terminal 402 and the other timing point of receiving a signal for a grant by the phone call receiving terminal 402 shall be named a standby session. And, a 180 signal sent from the phone call receiving terminal 402 to the phone call transmitting terminal 401 to maintain the standby session shall be named a waiting signal.

If the phone call transmitting terminal 401 receives the 200 OK signal 407, the phone call transmitting terminal 401 stops outputting the incoming call sound and informs the user of the phone call transmitting terminal 401 that the connection of the session is granted by the phone call receiving terminal 402.

Thereafter, the phone call transmitting terminal 401 sends a signal of ACK 408 (acknowledgement) to the phone call receiving terminal 402 in response to the 200 OK signal 407. In particular, the ACK signal 408 informs the phone call receiving terminal 402 that the session has been established by indicating that the 200 OK signal 407 was correctly received.

A billing region 404 in accordance with a policy of a communication service provider is explained as follows. First of all, a billing generally starts from a timing point of sending the 200 OK signal 407 to the phone call transmitting terminal 401 from the phone call receiving terminal 402. Hence, a region before sending the 200 OK signal 407 can be named a non-billing region 403 and a region after sending the 200 OK signal 407 can be named a billing region 404.

Meanwhile, there are methods of exchanging a prescribed amount of data in a standby session of the non-billing region 403. Examples of these methods are explained as follows.

First of all, if an available radio resource is used for the above-mentioned invite signal 405, data can be exchanged in the non-billing region 403 as well. In this case, the invite signal 405 includes an available radio resource amounting to about 1 KB. And, it is able to send data using this resource.

In case of performing a transmission using RTP/RTSP (real time protocol/real time streaming protocol), billing may not be performed despite depending on a policy of a communication service provider. Moreover, if data is transmitted under RTP/RTSP, it can be transmitted by streaming.

If the INFO Method of SIP is used, data amounting to about 2 MB can be transmitted. Yet, if the INFO Method is used, it is impossible to send data by streaming unlike the case under RTP/RTSP.

Besides, data can be transmitted under MSRP (message session relay protocol), SIP Message, HTTP, or the like.

As mentioned in the above description, since available radio resources may remain in an early media session, it is possible to utilize the available radio resources.

Therefore, when a call is received from a second counterpart in the course of performing a previous call to a first counterpart, the present invention proposes a method of transmitting data to the second counterpart through an early media session prior to an establishment of a session for making a call.

According to the proposed method, it is advantageous in that a message for rejecting an incoming call from the second counterpart can be sent without incurring a charge in various ways. For instance, it is able to inform the second counterpart that a call connection is impossible using a simple voice message. Alternatively, it is able to send a text message or an image file to indicate that the line is busy.

Embodiments of the present invention shall be described with reference to the accompanying drawings as follows.

Figure 5:
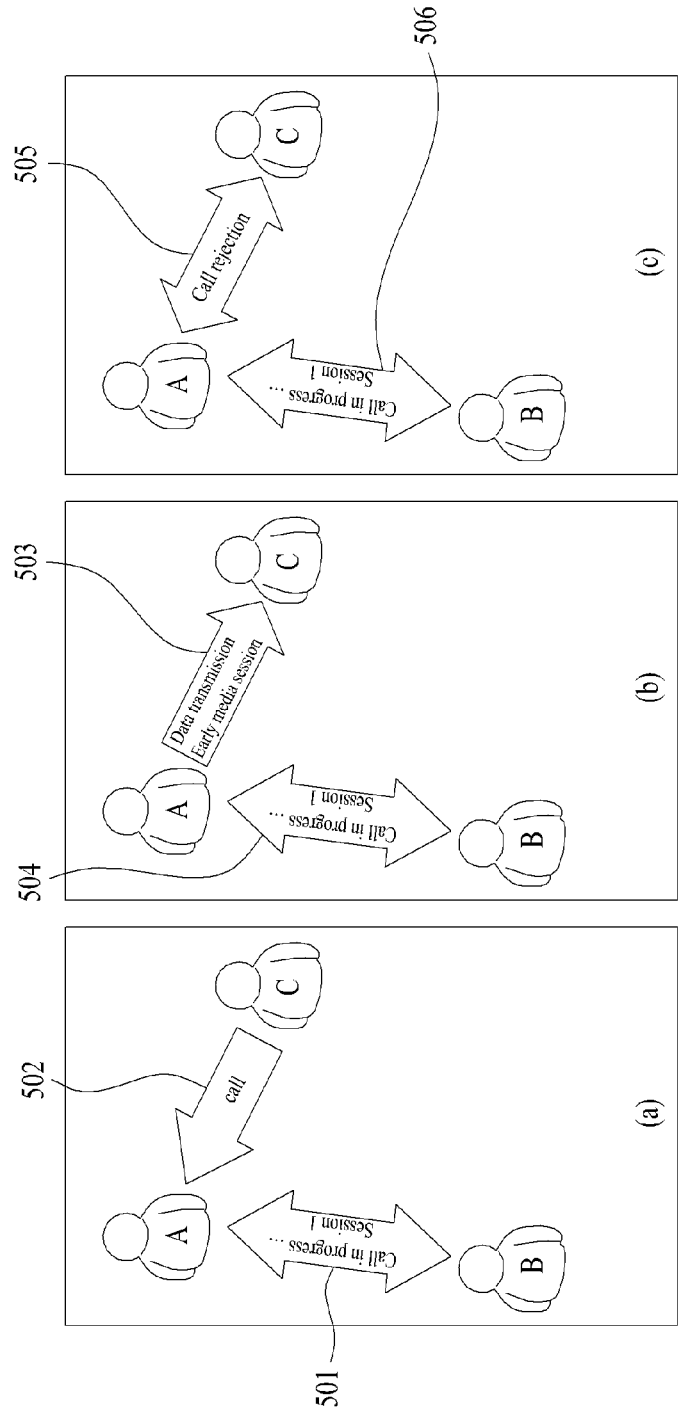
FIG. 5 is a diagram for one example of a method of transmitting data before rejecting a phone call for a received call signal using an early media session according to one embodiment of the present invention.

FIG. 5 is a diagram of one example of a method of transmitting data before rejecting a phone call for a received call signal using an early media session according to one embodiment of the present invention.

Referring to FIG. 5(*a*), a user A of a mobile terminal is making a call to a first counterpart B through a first session 501. In doing so, a call signal 502 is being received from a second counterpart C. In this case, an embodiment of the present invention proposes a method of not establishing a session with the second counterpart C.

FIG. 5(*b*) shows that data is being transmitted using an early media session 503 in response to a call signal reception from the second counterpart C. In this case, the transmitted data may include data informing the second counterpart C that the corresponding call is not acceptable. This data is described with reference to FIG. 6 and FIG. 7 as follows.

Figure 6:
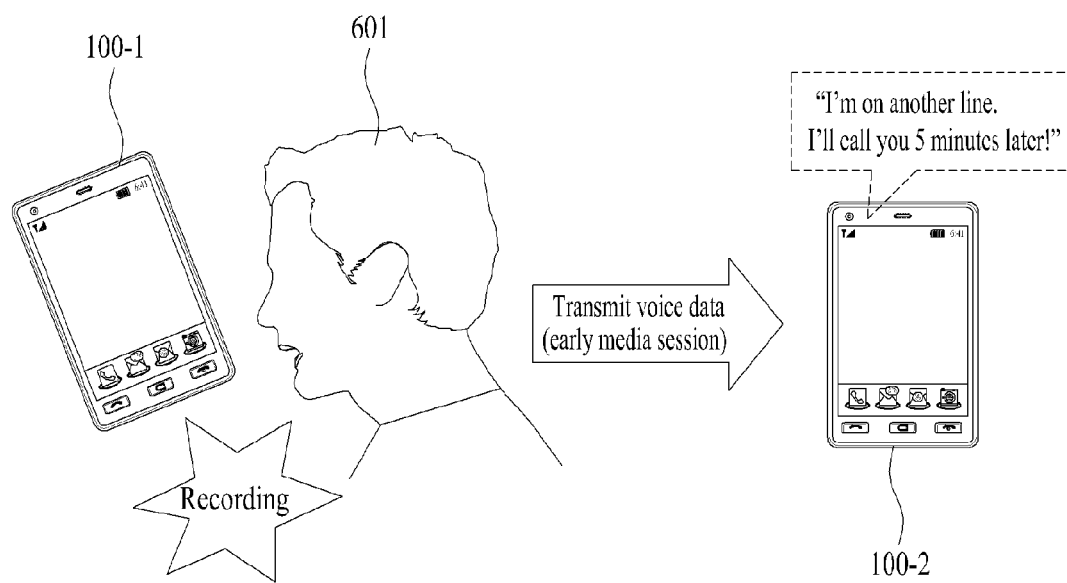
FIG. 6 is a diagram for one example of data transmitted in an early media session according to one embodiment of the present invention.

FIG. 6 is a diagram for one example of data transmitted in an early media session according to one embodiment of the present invention.

Referring to FIG. 6, a user 601 of a mobile terminal 100-1 receives a call signal from a second counterpart in the course of making a call to a first counterpart.

The user 601 of the mobile terminal 100-1 can record a message to send to the second counterpart in a simple manner via a microphone 122 of the mobile terminal 100-1. For instance, the user 601 can record a voice message 'I'm on the other line. I'll call you after 5 minutes.' for the second counterpart. If so, a controller 180 of the mobile terminal 100-1 can transmit the recorded voice data to a mobile terminal 100-2 of the second counterpart using an early media session. Having received the voice data, the mobile terminal 100-2 of the second counterpart can inform the second counterpart of the received voice data via the audio output module 152.

Figure 7:
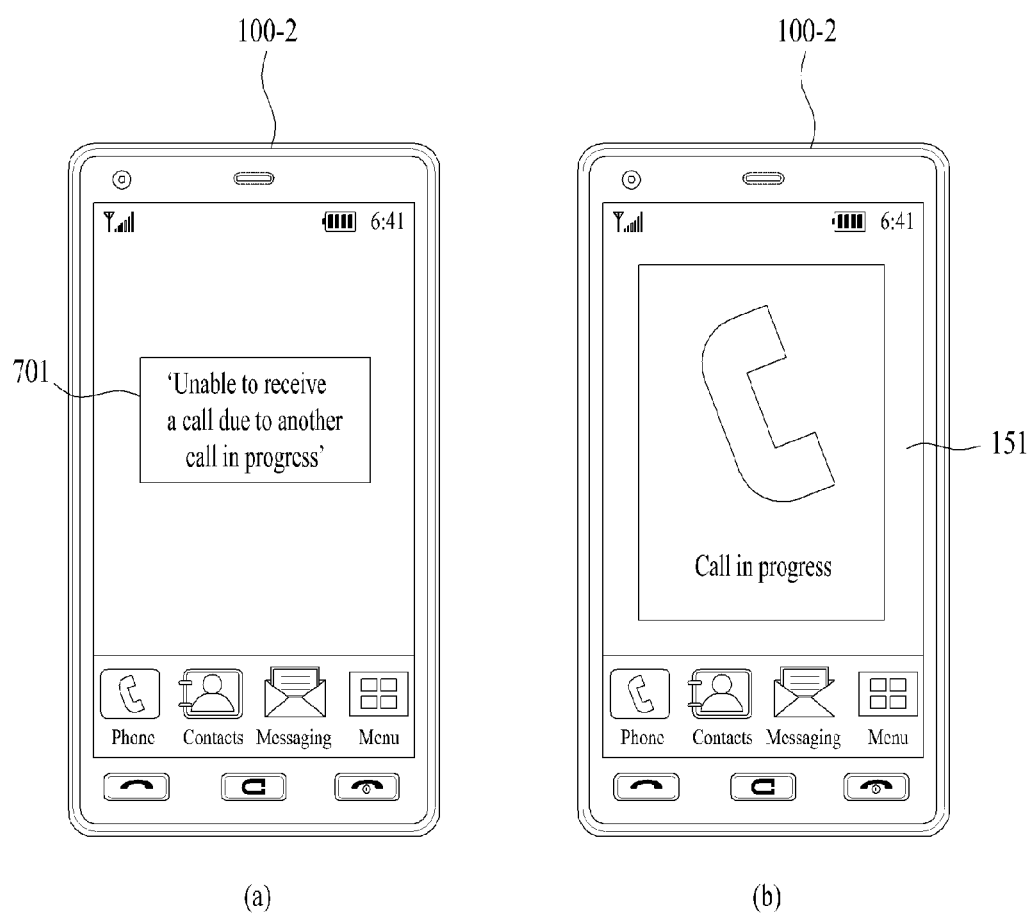
FIG. 7 is a diagram for another example of data transmitted in an early media session according to one embodiment of the present invention.

FIG. 7 is a diagram for another example of data transmitted in an early media session according to one embodiment of the present invention.

FIG. 7(*a*) shows that text data can be transmitted through an early media session.

In the following description, a mobile terminal configured to transmit data using an early media session shall be named a transmitting side mobile terminal 100-1 and a mobile terminal configured to receive the data shall be named a receiving side mobile terminal 100-2.

In case that text data 701 previously saved in the transmitting side mobile terminal 100-1 is transmitted to the receiving side mobile terminal 100-2, the text data 701 can be displayed on a display unit 151 of the receiving side mobile terminal 100-2. For instance, if the previously saved text data 701 includes 'Unable to receive a call due to another call in progress', if this text data 701 is transmitted via an early media session, the display configuration shown in FIG. 7(*a*) can be displayed on the display unit of the receiving side mobile terminal 100-2.

FIG. 7(*b*) shows that image data can be transmitted via an early media session. In case that image data previously saved in the transmitting side mobile terminal 100-1 is transmitted to the receiving side mobile terminal 100-2, the image data can be displayed on the display unit 151 of the receiving side mobile terminal 100-2.

On the other hand, voice data previously saved as the transmittable data can be transmitted [not shown in FIG. 7]. For instance, in case of a current call in progress, the voice data 'I'll call you later due to a current call in progress' can be transmitted as a previously saved message using an early media session.

The data described with reference to FIG. 7 may include data previously saved in the transmitting side mobile terminal 100-1. In this case, the saved data may include various kinds of multimedia data as well as the above-mentioned data and detailed examples are described as follows.

Music and video data may be saved in the memory 160 of the mobile terminal 100. Hence, the transmitting side mobile terminal 100-1 can transmit music data to the receiving side mobile terminal 100-2 using an early media session. The receiving side mobile terminal 100-2 is then able to receive a message by playing back the music data.

Alternatively, an MMS (multimedia messaging service) message may be saved instead of the text message shown in FIG. 7. For instance, if a user of a transmitting side mobile terminal 100-1 has a reserved appointment of a phone meeting from 10:00 to 12:00, the user of the transmitting side mobile terminal 100-1 can previously save his schedule in an MMS text message. If so, the saved MMS text message can be set to be directly sent in response to a different call signal that may be received in the course of the phone meeting. In particular, if a call signal is received, the transmitting side mobile terminal 100-1 can send the previously saved MMS message using an early media session to a receiving side mobile terminal 100-2 transmitting a call signal.

Meanwhile, previously saved data may include an HTTP (hypertext transfer protocol) address. For instance, the transmitting side mobile terminal 100-1 may always upload its schedule table to the HTTP address. Hence, when a call signal is received, if a user of the transmitting side mobile terminal 100-1 transmits the HTTP address to a counterpart of the call signal, the counterpart may refer to the link for a phone call schedule.

Moreover, a schedule data itself may be saved. When a different call signal is received in the course of making a call, the user of the transmitting side mobile terminal 100-1 transmits the schedule data itself to enable a counterpart to refer to the schedule data.

Meanwhile, the above-enumerated data may be transmitted separately or at least one of the above-enumerated data can be transmitted in a manner of being mixed together.

Furthermore, the data described with reference to FIG. 7 may include an instantly taken photo or video rather than the data previously saved in the mobile terminal 100.

Referring now to FIG. 5, the user A transmits data 503 to the second counterpart C using the early media session. In doing so, the first session connected with the first counterpart B is maintained intact 504.

The call signal received from the second counterpart C is then rejected 505, as shown in FIG. 5(*c*). Subsequently, the call to the first counterpart B is resumed 506 using the first session. In the following description, a process for a user A to exchange signals with a counterpart B or a counterpart C is described with reference to FIG. 8.

Figure 8:
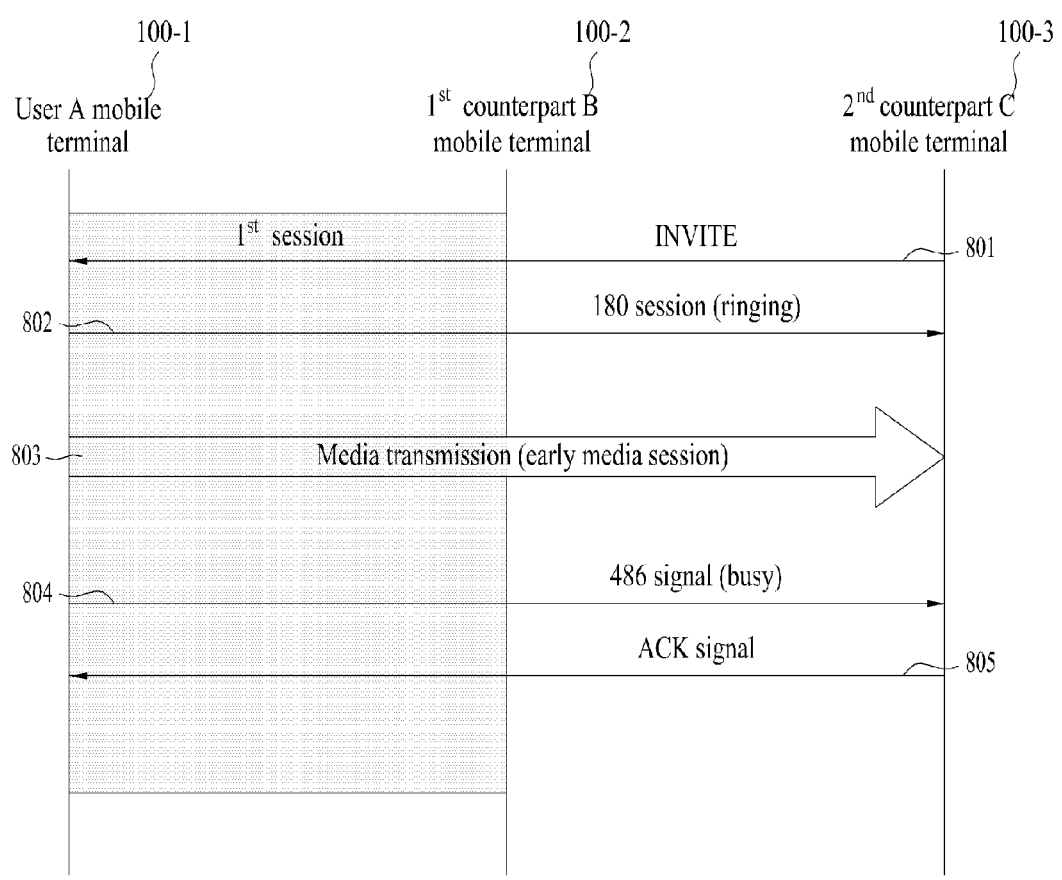
FIG. 8 is a diagram for one example of a signal exchanged under session initiation protocol (SIP) according to one embodiment of the present invention.

FIG. 8 is a diagram of one example of a signal exchanged under session initiation protocol (SIP) according to one embodiment of the present invention. In particular, FIG. 8 shows a state in which a mobile terminal of user A 100-1 and a mobile terminal of first counterpart B 100-2 establish a first session to talk over a mobile terminal Referring to FIG. 8, while a user A and a first counterpart B are talking to each other over a mobile terminal, if a mobile terminal of second counterpart C 100-3 makes a call, an invite signal 801 is received from the second counterpart C. If a mobile terminal 100-1 of the user A receives the invite signal 801 from a mobile terminal 100-3 of the second counterpart C, as mentioned in the foregoing description with reference to FIG. 4, the mobile terminal 100-1 of the user A sends a 180 signal 802 to the mobile terminal 100-3 of the second counterpart C.

If the mobile terminal 100-1 of the user A receives a call from the second counterpart C in the course of the call to the first counterpart B, the mobile terminal 100-1 of the user A can send prescribed data to the mobile terminal of second 2nd counterpart C. In doing so, as mentioned in the foregoing description with reference to FIG. 5, the prescribed data can be transmitted using an early media session 803 without establishing a session with the second counterpart C. In this case, the prescribed data may include the same data described with reference to FIG. 6 or FIG. 7.

After the prescribed data has been sent via the early media session 803, the mobile terminal 100-1 of the user A sends a 486 signal 804, which indicates that the invite signal 801 from the second counterpart C is not acceptable to the mobile terminal 100-3. This signal includes the signal for rejecting the call signal because another call cannot be made currently. Having received the 486 signal 804, the mobile terminal 100-3 transmits an ACK signal 805 to the mobile terminal 100-1 in response to the 486 signal 804 and then ends the signal transceiving.

In the whole process shown in FIG. 8, it can be confirmed that a second session between the user A and the second counterpart C is not established while the first session between the user A and the first counterpart B is continuously maintained. Therefore, it is advantageous in that prescribed data can be transmitted without charging the second session, which is not established, in accordance with a communication billing policy of a communication service provider.

Figure 9:
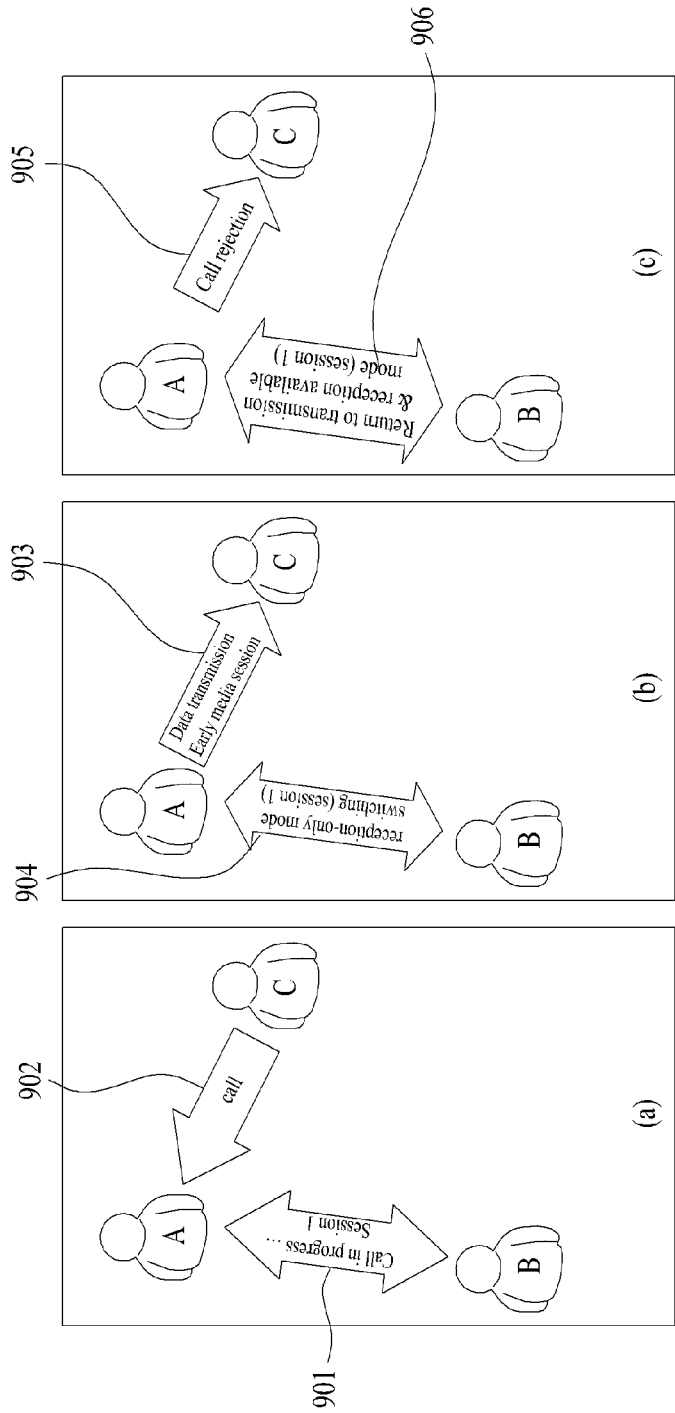
FIG. 9 is a diagram for another example of a method of transmitting data before rejecting a phone call for a received call signal using an early media session according to one embodiment of the present invention.

FIG. 9 is a diagram of another example of a method of transmitting data before rejecting a phone call for a received call signal using an early media session according to one embodiment of the present invention.

Referring to FIG. 9(*a*), like the method shown in FIG. 5, a user A of a mobile terminal is making a call to a first counterpart B through a first session 901 while a call signal 902 is being received from a second counterpart C.

FIG. 9(*b*) shows that data is being transmitted using an early media session 903 in response to a call signal reception from the second counterpart C. In this case, the transmitted data may include data informing the second counterpart C that the corresponding call is not acceptable.

FIG. 9(*b*) differs from FIG. 5 in that the settings of the first session are changed. For instance, referring to FIG. 9(*b*), the first session may have the settings available for a reception of voice only and unavailable for a transmission. In particular, the first session 904 may be configured to be available for reception only.

This is because a recording process, as shown in FIG. 6, may exist in the course of transmitting data to the second counterpart C. And, the user may not want the first counterpart B to listen to a content recorded to be transmitted to the second counterpart C.

Hence, the mobile terminal of the user A makes a proposal of changing setting parameters for the first session to the first counterpart B using a re-invite signal. In this case, the re-invite signal includes the signal transmitted under SDP (session description protocol) in case of attempting to change setting parameters for a currently connected session.

According to SDP, the setting parameters may include a state (sendrecv Media) of a first session available for both transmission and reception, a state (Sendonly Media) of a first session available for transmission only, a state (reconly Media) of a first session available for reception only, and a state (Inactive Media Hold) of a first session of which transmission and reception are held. According to the embodiment of FIG. 9(*b*), the mobile terminal of the user A sends a setting parameter, which proposes a change into a reception-only state, to the mobile terminal of the first counterpart B using a re-invite signal. If so, the mobile terminal of the first counterpart B sends a 200 OK signal to the mobile terminal of the user A in response to the received re-invite signal. Having received the 200 OK signal, the mobile terminal of the user A sends an ACK signal to the mobile terminal of the first counterpart B to inform the first counterpart B that the settings of the session have been changed.

Subsequently, referring to FIG. 9(*b*), the user A transmits data to the second counterpart C using an early media session 903. This is the same process described with reference to FIG. 5 and its details shall be omitted from the following description.

After the data has been transmitted via the early media session by the mobile terminal of the user A, the call signal received from the second counterpart C is rejected 905. Subsequently, the mobile terminal of the user A can make the session with the first counterpart B return to the original settings 906. This is because the state of the first session shown in FIG. 9(*b*) is the state receivable by the mobile terminal of the user A only.

In this case, the mobile terminal of the user A sends a re-invite signal to the mobile terminal of the first counterpart B to propose to switch to a mode available for both transmission and reception, which are the original settings. If so, the mobile terminal of the first counterpart B sends a 200 OK signal to the mobile terminal of the user A to respond to the change of the session settings. Subsequently, the mobile terminal of the user A sends an ACK signal to the mobile terminal of the first counter part B in response to the 200 OK signal.

An overall process for exchanging signals shown in FIG. 9 is described in detail with reference to FIG. 10 as follows.

Figure 10:
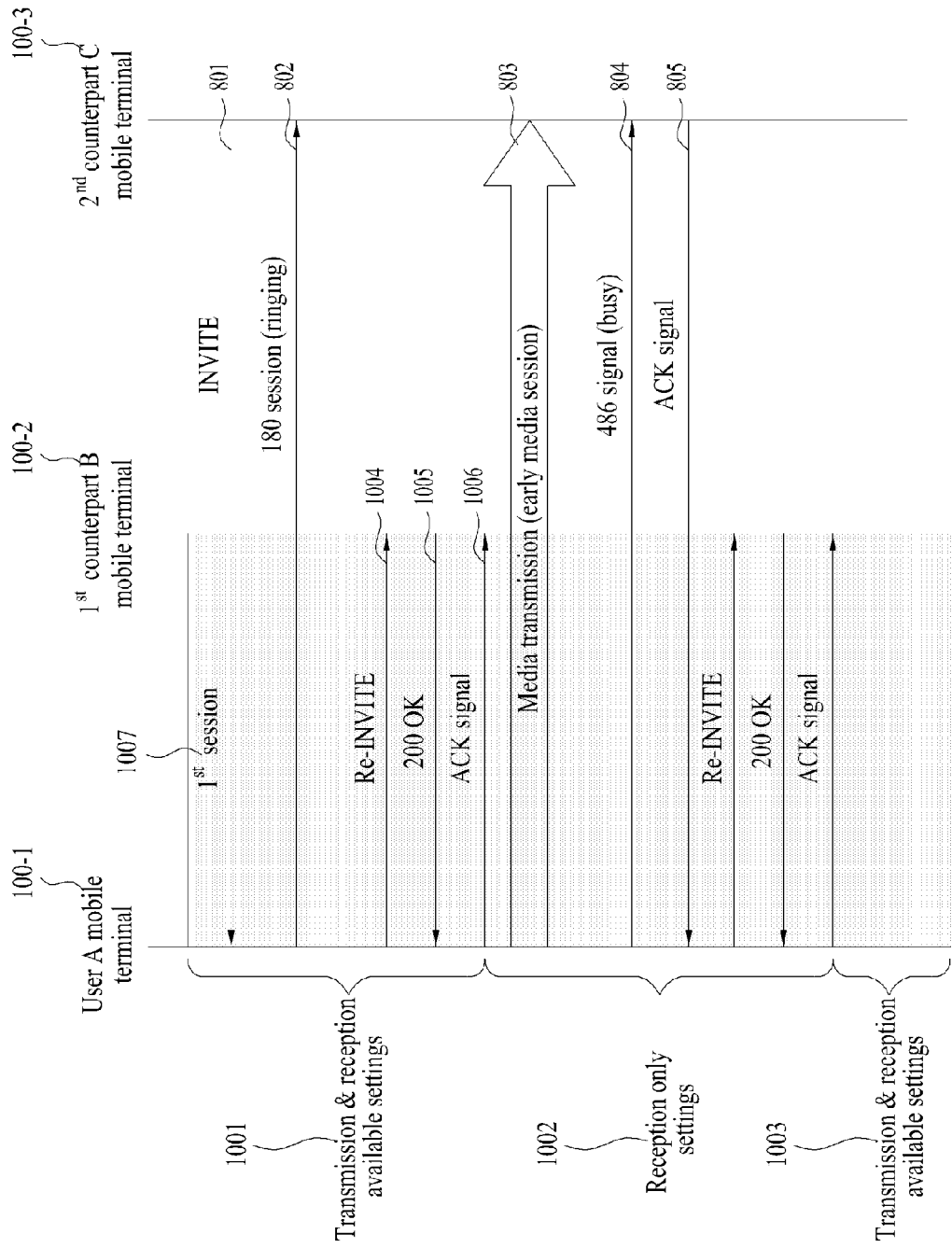
FIG. 10 is a diagram for another example of signals exchanged under SIP according to one embodiment of the present invention.

FIG. 10 is a diagram of another example of signals exchanged under SIP according to one embodiment of the present invention. FIG. 10 shows a state that a first session is established to enable a call between a mobile terminal of user A 100-1 and a mobile terminal of first counterpart B 100-2.

Referring to FIG. 10, while a call is performed between a user A and a first counterpart B using a first session 1007 a mobile terminal 100-1 of the user A receives an invite signal 801 from a mobile terminal 100-3 of a second counterpart C. Having received the invite signal 801 from the mobile terminal 100-3 of the second counterpart C, the mobile terminal 100-1 of the user A sends a 180 bell sound signal 802 to the mobile terminal 100-3 of the second counterpart C. This is the same step as described with reference to FIG. 4.

If receiving the phone call from the second counterpart C in the course of the call made to the first counterpart B, the mobile terminal 100-1 of the user A can send a re-invite signal 1004 to the mobile terminal 100-2 of the first counterpart B to change the settings of the first session 1007.

This re-invite signal 1004 is the signal for the mobile terminal 100-1 of the user A to propose a change of the first session 1007 settings to the mobile terminal 100-2 of the first counter part B. For instance, the re-invite signal 1004 including setting parameters for enabling the first session 1007 to switch to a reception-only state can be sent to the mobile terminal 100-2 of the first counterpart B.

Having received the re-invite signal 1004, the mobile terminal 100-2 of the first counterpart B sends a 200 OK signal 1005, which indicates the setting change is accepted, to the mobile terminal 100-1. And, the mobile terminal 100-1 then sends an ACK signal 1006, which indicates that the settings have been changed, to the mobile terminal 100-2.

A region 1001, which is the region before the ACK signal 1006, in the first session 1007 may include the region available for both transmission and reception. Yet, according to the above example, the region 1002, during which the settings are changed by the re-invite signal 1004, may include the settings available for reception only.

Thus, after the settings of the first session 1007 have been changed, the mobile terminal 100-1 of the user A can transmit prescribed data to the second counterpart C. In this case, as mentioned in the foregoing description with reference to FIG. 5, the prescribed data can be transmitted using an early media session 803 without establishing a session with the second counterpart C 100-3.

After the prescribed data has been transmitted, the mobile terminal 100-1 of the user A sends a 486 signal 804, which indicates that the invite signal 801 from the second counterpart C is not acceptable, to the mobile terminal 100-3. Having received the 486 signal 804, the mobile terminal 100-3 sends an ACK signal 805 to the mobile terminal 100-1 in response to the 486 signal 804 and then ends the signal transceiving.

In the whole process shown in FIG. 10, like the former process shown in FIG. 8, it can be confirmed that a second session between the user A and the second counterpart C is not established while the first session 1007 between the user A and the first counterpart B is continuously maintained.

Figure 11:
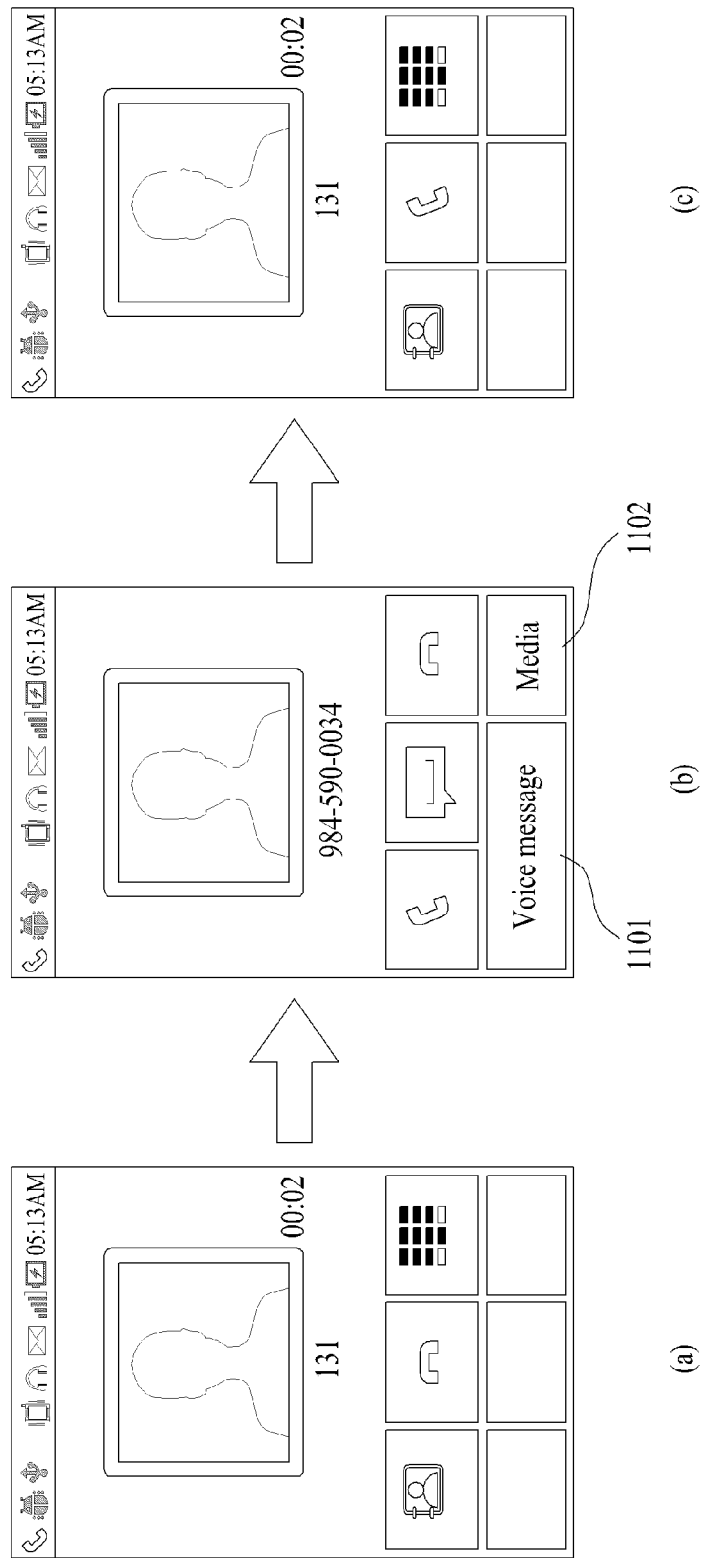
FIG. 11 is a diagram for one example of a configuration of a mobile terminal in case of receiving a call signal from one counterpart in the course of talking to another counterpart over the mobile terminal according to one embodiment of the present invention.

FIG. 11 is a diagram of one example of a configuration of a mobile terminal in case of receiving a call signal from a second counterpart in the course of talking to a first counterpart over the mobile terminal according to one embodiment of the present invention. Touch items having nothing to do with the embodiment of the present invention shall be omitted.

FIG. 11(b) is a diagram of a configuration of a mobile terminal in case of receiving a call signal from a second counterpart during a state shown in FIG. 11(a). Referring to FIG. 11(b), a voice message item 1101 and a media item 1102 are displayed.

If a touch to the voice message item 1101 is input, the mobile terminal records a voice message to send to the second counterpart and is then able to send the recorded voice message using an early media session mentioned in the foregoing description.

If a touch to the media item 1102 is input, the mobile terminal 100 can send previously saved data to the second counterpart. In this case, the previously saved data is the same as described with reference to FIG. 7 and its details shall be omitted.

After the transmission has been completed, the mobile terminal can return to the original call state, and more particularly, to the state configuration shown in FIG. 11(c).

Figure 12:
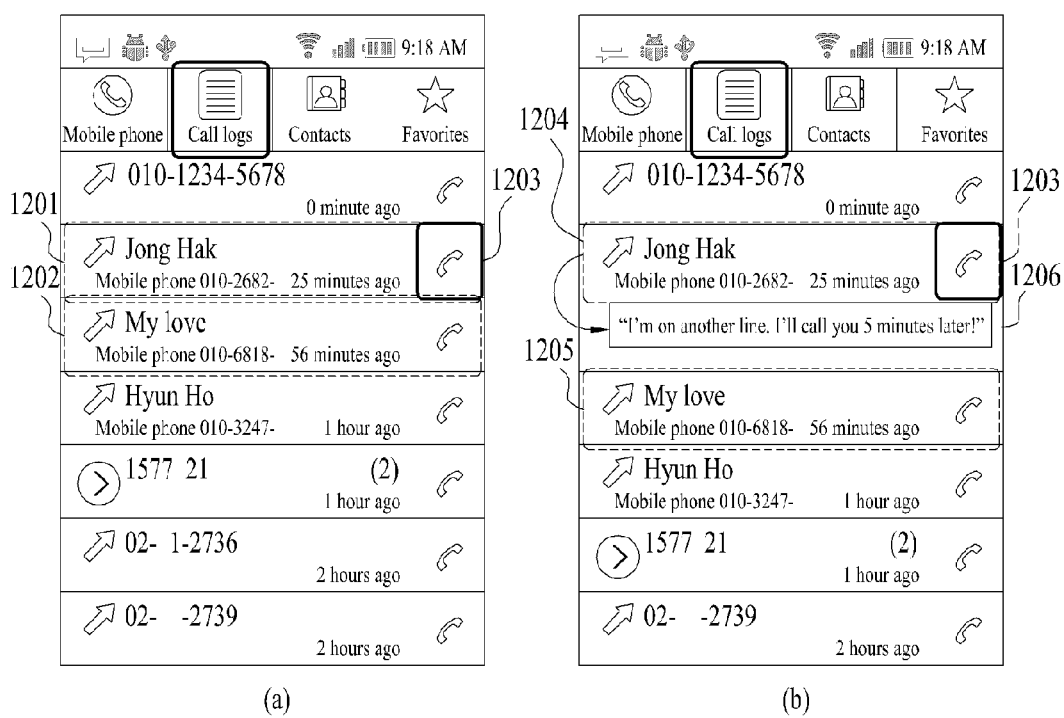
FIG. 12 is a diagram for one example of a method of reading transmitted data on a recent call list according to one embodiment of the present invention.

FIG. 12 is a diagram of one example of a method of reading transmitted data on a recent call list according to one embodiment of the present invention.

Referring to FIG. 12(a), a phone call is made to 'Jong Hak' in the course of a call to 'My Love'. The controller 180 can control the display to output a call log entry 1202 of a call to 'My Love' 56 minutes ago on the recent call list. The controller 180 can control the display to output a log 1201, which indicates that data is transmitted to the 'Jong Hak' 25 minutes ago, to the recent call list. Meanwhile, since the call to 'Jong Hak' on the call log list is not actually performed, the data is transmitted only. Hence, an indicator 1203, which indicates that the transmission of only the data has been performed, can be outputted to the call log list. The indicator 1203 shown in FIG. 9(a) has a squared box shape. The indicator 1203 can have different shapes, such as a prescribed symbol, a prescribed numeral, a prescribed character, or a combination thereof.

According to the embodiment of the present invention, if a prescribed input is applied to the call log of transmitting data 1203, the controller 180 may control the prescribed data to be displayed to a user. For instance, if the user transmits a voice data to a counterpart of a corresponding call, the controller 180 recognizes the voice data, coverts the recognized voice data to a text, and then displays the text to the user. Alternatively, if the data transmitted to the counterpart is an image or video, if a touch input is applied to the corresponding call log, the user can view the image or video.

FIG. 12(b) shows another example of the available state configuration in the same situation as shown in FIG. 12(a). Referring to FIG. 12(b), a log 1204 indicating that data was sent to 'Jong Hak' and a phone call log 1205 of 'My love' are the same as shown in FIG. 12(a) and their details shall be omitted from the following description.

It may be assumed that the data sent to the counterpart named 'Jong Hak' is the voice data described with reference to FIG. 6. In this case, the mobile terminal 100 recognizes a user's voice, converts the recognized voice to a text, and then displays the text 1206 on the recent call list.

Therefore, according to one embodiment of the present invention, if a user reads the recent call list, the user is able to view at least one of: 1) receiving a call from a different counterpart during a call in progress; 2) transmitting data to a different counterpart; and 3) a transmitted data. Moreover, in case that a voice data is sent to a receiving counterpart, the content of the voice data can be viewed from the recent call list.

Figure 13:
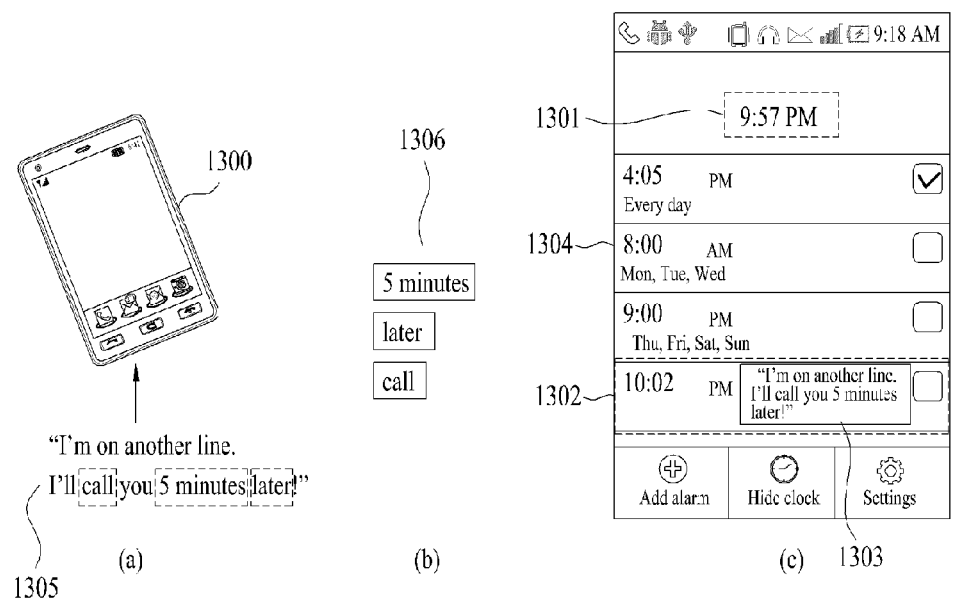
FIG. 13 is a diagram for one example of activating a prescribed function of an application by recognizing audio voice data according to one embodiment of the present invention.

FIG. 13 is a diagram of one example of activating a prescribed function of an application by recognizing audio voice data according to one embodiment of the present invention. FIG. 13(a) is a diagram to illustrate a voice data 1305 transmitted via the same early media session shown in FIG. 6. In particular, the voice data includes a content of "I'm on another line. I'll call you 5 minutes later!".

The mobile terminal 1300 recognizes the voice data, referring to FIG. 13(b), and is then able to select specific keywords 1306. In this case, the specific keywords may include '5 minutes', 'later' and 'call'. The controller 180 can set an alarm for making a call after 5 minutes using the recognized specific keywords.

FIG. 13(c) is a diagram of a configuration in which an automatically set alarm 1302 is added to an alarm list 1304. Referring to FIG. 13(c), a current hour 1301 is 09:57. Hence, the automatically set alarm 1302 corresponds to 10:02 PM that is 5 minutes after 09:57. And, a content 1303 resulting from converting the voice data 1305 to text can be displayed on the list 1304 having the automatically set alarm 1302 displayed thereon.

In other embodiment, the voice data is "I'll call you about 10 o'clock.", specific keywords "10 o'clock" and "call" can be recognized. The controller 180 can set an alarm, which indicates that a phone call will be made at 10 o'clock, using the recognized keywords.

Accordingly, embodiments of the present invention provide various effects and/or features.

According to at least one of embodiments of the present invention, while a call to one counterpart is being performed, when a call received from another counterpart is rejected, it is advantageous in that a rejection message can be efficiently delivered using a further visual and/or auditory means.

Beside the currently calling state, one embodiment of the present invention is applicable for setting a response to a call, which is received when a waiting state is entered or a specific application (e.g., a video, a game, a document job, a project, etc.) is active, to be processed. This method is described in detail with reference to FIG. 14 as follows.

FIG. 14 is a diagram of a process for processing a response to a call, which is received while a specific application (e.g., a video player) is activated by the controller 180, according to another embodiment of the present invention. FIG. 14 shows a time axis 1401 and a mobile terminal FIG. 14(a)~FIG. 14(d) corresponding to the time axis.

FIG. 14(a) is a diagram for a state of a mobile terminal in the course of running a video player. In this state, a mobile terminal can receive a call signal. The controller 180 of the mobile terminal 100 can provide a user with a selection menu 1403 shown in FIG. 14(b), for selecting how to respond to a call signal in response to the reception of the call signal in the course of running the video player application. Referring to the selection menu 1403 shown in FIG. 14(b), in response to the call signal, an MMS message may be sent, an audio may be transmitted, a photo/video may be transmitted, or a reception of a photo/video may be rejected.

In this case, the transmitted data may be transmitted in a waiting session of a non-billing region as previously described. Hence, the transmitted data may be billed by a billing policy of a mobile communication service provider or it may not. Even if the transmitted data is billed, an amount of the billing may be smaller than that of the data transmission in the billing region.

For instance, if the audio transmission is selected by a user, the controller 180 can display a popup message window 1404 as shown in FIG. 14(c), indicating that the audio is being recorded on the display unit and is also able to display an icon 1405 for transmitting the recorded audio and an icon 1406 for cancelling the audio transmission.

After the audio has been transmitted, the controller 180 can send a rejection signal to the mobile terminal having transmitted the call signal. Thereafter, the controller 180 can return to an original screen as shown in FIG. 14(d).

Moreover, the present invention may be non-limited by the above-described embodiment. According to another embodiment of the present invention, in response to a reception of a call signal in the course of running a specific application, the controller 180 can transmit previously-saved data without displaying the selection menu 1403.

In particular, a user can set a specific application, a time and a media data to transmit in advance. For instance, in order to process a response to a call signal received between 10:00 AM to 1:00 PM, the controller 180 saves a previously-written MMS message and is then able to directly send the saved MMS message in response to the corresponding call signal.

While a pay/free video having an end time is being watched or a specific job saved in a schedule is in progress, if a phone call reception occurs, a user is able to send a text message, which indicates that the user will make a phone call at a specific timing point of completing the video or job, to the caller while watching the video or running an application for the specific job. Alternatively, the text message may be replaced by a voice message created in a manner of recording a user's voice. Alternatively, the text message may be replaced by a message indicating information on a time resulting from calculating a time remaining until an end timing point obtained by the controller 180.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a wireless communication unit; and
a controller configured to:
control the wireless communication unit to establish a first communication session with a first mobile terminal;
receive at least one call signal from at least one second mobile terminal via the wireless communication unit during the first communication session, the at least one call signal requesting to establish at least a second communication session;

control the wireless communication unit to transmit a first signal to the first mobile terminal using SDP (session description protocol), the first signal including a parameter indicating that only a reception mode is available, to propose changing parameters of the first communication session in order to change a mode of the first communication session to a reception-only mode; and control the wireless communication unit to transmit user data to the at least one second mobile terminal via an available radio resource without establishing a communication session with the at least one second mobile terminal.

2. The mobile terminal of claim 1, wherein the controller is further configured to control the wireless communication unit to transmit a second signal for maintaining a standby session.

3. The mobile terminal of claim 1, wherein the controller is further configured to change the mode of the first communication session back to a mode allowing both transmission and reception after transmitting the user data.

4. The mobile terminal of claim 3, wherein the controller is further configured to control the wireless communication unit to transmit a second signal to the first mobile terminal using the SDP, the second signal including parameters indicating that a transmission mode and the reception mode are available, to propose changing the parameters of the first communication session in order to change the mode of the first communication session to the mode allowing both transmission and reception.

5. The mobile terminal of claim 3, wherein the controller is further configured to control the wireless communication unit to transmit a message to the first mobile terminal indicating that the mode of the first communication session has been changed.

6. The mobile terminal of claim 1, further comprising a microphone unit, wherein the user data comprises a user's voice data input via the microphone unit.

7. The mobile terminal of claim 6, wherein the controller is further configured to:

convert the voice data to text data corresponding to a content of the voice data; and set an indicator based on the text data.

8. The mobile terminal of claim 1, further comprising a memory unit configured to store at least one multimedia data item, wherein the user data comprises the stored at least one multimedia data item.

9. The mobile terminal of claim 1, wherein the user data is transmitted using RTP/RTSP (real time protocol/real time streaming protocol).

10. A method of controlling a mobile terminal, the method comprising:

establishing a first communication session with a first mobile terminal;

receiving at least one call signal from at least one second mobile terminal, the at least one call signal requesting to establish at least a second communication session;

transmitting a first signal to the first mobile terminal using SDP (session description protocol), the first signal including a parameter indicating that only a reception mode is available, to propose changing parameters of the first communication session in order to change a mode of the first communication session to a reception-only mode; and transmitting user data to the at least one second mobile terminal via an available radio resource without establishing a communication session with the at least one second mobile terminal.

11. The method of claim 10, further comprising transmitting a second signal for maintaining a standby session.

12. The method of claim 10, further comprising:

changing the mode of the first communication session back to a mode allowing both transmission and reception after transmitting the user data.

13. The method of claim 12, wherein changing the mode of the first communication session to the mode allowing both transmission and reception comprises:

creating a second signal using the SDP, the second signal including parameters indicating that a transmission mode and the reception mode are available; and transmitting the second signal to the first mobile terminal to propose changing the parameters of the first communication session in order to change the mode of the first communication session to the mode allowing both transmission and reception.

14. The method of claim 12, further comprising transmitting a message to the first mobile terminal indicating that the mode of the first communication session has been changed.

15. The method of claim 10, further comprising receiving a user's voice data input via a microphone, wherein the user data comprises the received voice data.

16. The method of claim 15, further comprising:

converting the voice data to text data corresponding to a content of the voice data; and setting an indicator based on the text data.

17. The method of claim 10, further comprising storing at least one multimedia data item, wherein the user data comprises the stored at least one multimedia data item.

18. The method of claim 10, wherein transmitting the user data comprises transmitting the user data using RTP/RTSP (real time protocol/real time streaming protocol).

19. A mobile terminal comprising:

a wireless communication unit;

a display;

a microphone;

a memory configured to store information; and a controller configured to:

cause the wireless communication unit to establish a first communication session with a first mobile terminal;

receive at least one call signal from at least one second mobile terminal via the wireless communication unit during the first communication session, the at least one call signal requesting to establish at least a second communication session;

cause the wireless communication unit to transmit user data to the at least one second mobile terminal via an available radio resource without establishing a communication session with the at least one second mobile terminal, where the user data comprises a user's voice data input via the microphone;

convert the voice data to text data corresponding to a content of the voice data;

cause displaying of a recent call list on the display based on the stored information, the recent call list including at least the first communication session and the at least one call signal; and cause displaying of the text data on the recent call list, wherein the stored information is related to the first communication session and the at least one call signal.

20. The mobile terminal of claim 19, further comprising an audio output module, wherein the controller is further configured to:
   cause storing of the voice data in the memory; and
   cause output of the stored voice data via the audio output module in response to a prescribed input.

21. A method of controlling a mobile terminal, the method comprising:
   establishing a first communication session with a first mobile terminal;
   receiving at least one call signal from at least one second mobile terminal, the at least one call signal requesting to establish at least a second communication session;
   storing information related to the first communication session and the at least one call signal;
   receiving a user's voice data via a microphone;
   transmitting user data to the at least one second mobile terminal via an available radio resource without establishing a communication session with the at least one second mobile terminal, the user data comprising the received voice data;
   converting the voice data to text data corresponding to a content of the voice data;
   displaying a recent call list based on the stored information, the recent call list including at least the first communication session and the at least one call signal; and
   displaying the text data on the recent call list.

22. The method of claim 21, further comprising:
   storing the received voice data; and
   outputting the stored voice data in response to a prescribed input.

* * * * *